US008720788B1

(12) United States Patent
Mizzo et al.

(10) Patent No.: US 8,720,788 B1
(45) Date of Patent: May 13, 2014

(54) RFID TAG

(71) Applicant: PINC Solutions, Alameda, CA (US)

(72) Inventors: Richard R. Mizzo, Danville, CA (US); Sing Yiu Cheung, South San Francisco, CA (US)

(73) Assignee: Pinc Solutions, Alameda, CA (US)

( * ) Notice: Subject to any disclaimer, the term of this patent is extended or adjusted under 35 U.S.C. 154(b) by 0 days.

(21) Appl. No.: 13/675,772

(22) Filed: Nov. 13, 2012

(51) Int. Cl.
*G06K 19/06* (2006.01)
(52) U.S. Cl.
USPC .......................... 235/492; 235/380; 235/375
(58) Field of Classification Search
USPC .......... 235/492, 380, 487, 375, 439, 449, 385
See application file for complete search history.

(56) References Cited

U.S. PATENT DOCUMENTS

| | | | |
|---|---|---|---|
| 8,079,518 B2 * | 12/2011 | Turner et al. | 235/385 |
| 2008/0303668 A1 * | 12/2008 | Rohlf et al. | 340/572.1 |
| 2010/0213263 A1 * | 8/2010 | Ho et al. | 235/487 |
| 2011/0102179 A1 * | 5/2011 | Ezzo et al. | 340/568.1 |

* cited by examiner

*Primary Examiner* — Edwyn Labaze
(74) *Attorney, Agent, or Firm* — Michael A. Glenn; Perkins Coie LLP

(57) ABSTRACT

An apparatus for temporarily attaching an RFID device to a mobile object, includes an RFID tag comprising an enclosure, attachment mechanism, handles, and an RFID device. The handles may be rotatable between a stowed position and a deployed position. The attachment mechanism may comprise magnets, which are used to attach the RFID tag to a metal support surface.

9 Claims, 5 Drawing Sheets

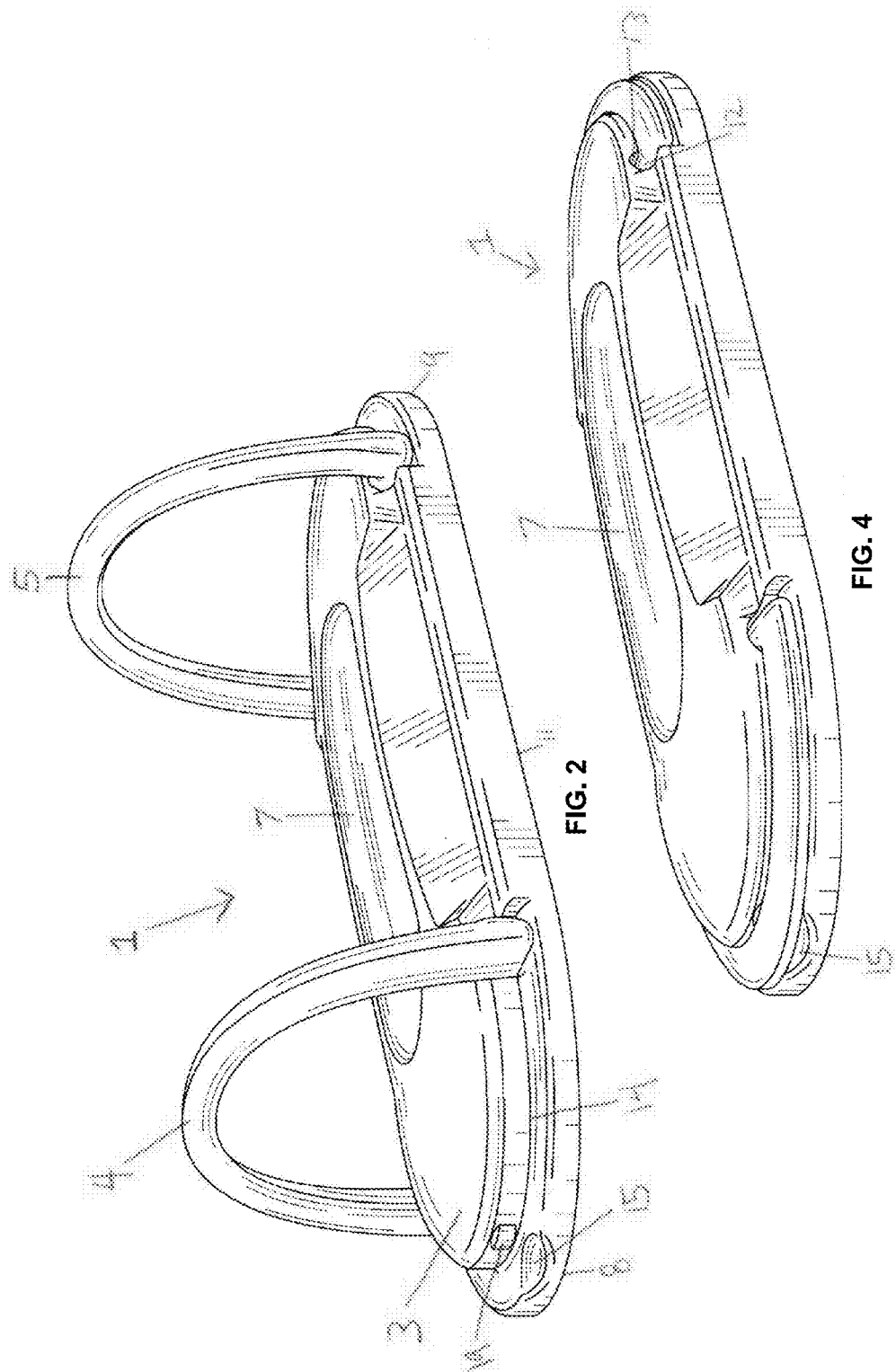

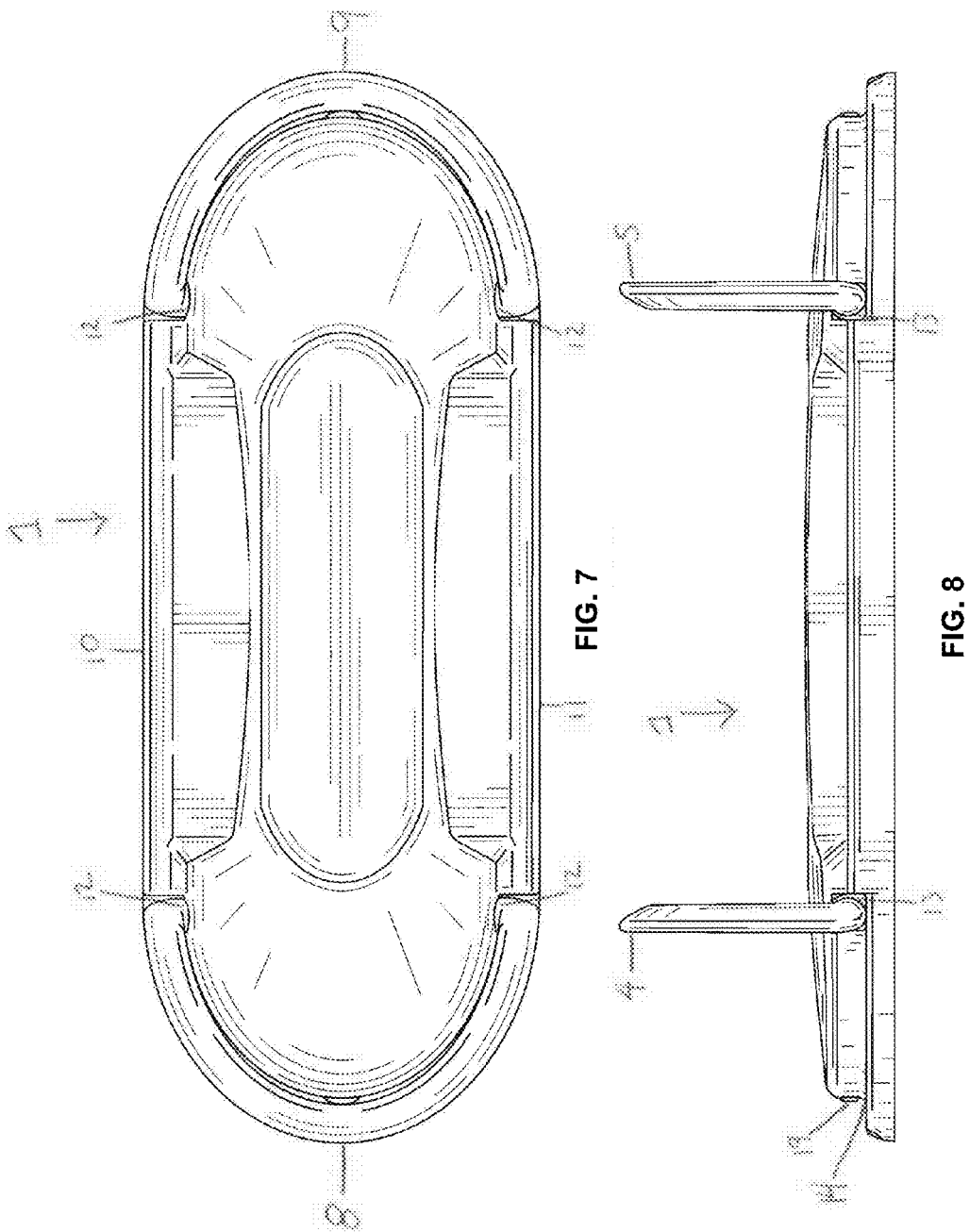

RFID TAG

BACKGROUND OF THE INVENTION

1. Technical Field

The invention relates to a removable tag that is used to identify the location of mobile objects in real time. More particularly, the invention relates to a removable tag for installation on trucks, trailers, intermodal containers, railcars and the like in the field of yard management.

2. Description of the Background Art

There are currently millions of trucks, semi-trailers, railcars, and intermodal containers in use in the United State. For logistics and efficiency it is desirable to know the position in real time of each piece of equipment. In order to do this radio frequency identification (RFID) tags are currently being used.

RFID tags are used to associate an object with an identification code or other information. RFID devices generally have a combination of antennas and analog and/or digital electronics, which may include for example communications electronics, data memory, and control logic.

RFID tags are used in position tracking systems to identify the location of mobile objects in real-time and are used in a wide variety of applications, including transportation, logistics management, healthcare, and security.

For objects that are moved with a vehicle, such as intermodal shipping containers or trailers, being able to locate the position of the objects in real-time can help improve the efficiency of supply-chain and inventory management while reducing the loss in productivity of assets. The use of RFID tags eliminates the need for staff members to search for trailers as well as enables carriers and shippers to access data regarding shipments' locations via the Internet. This is currently done by permanently securing RFID tags to objects by means such as screws, bolts rivets and welding. The RFID tags are then read by electronic readers, such as readers installed on gates at the entrance of a yard. The information gathered by the reader is then sent to a yard management system.

Another field that RFID tags are used is in a warehouse setting wherein a reader can be configured to read RFID tags and communicate the tag information to a warehouse management system.

Permanent tags have the disadvantages of being labor intensive to install, labor intensive to remove and replace, and requiring a different tag for every object to be tagged. Accordingly, it would be desirable to provide a tag that is not permanent and could be installed, removed and replaced with little labor as well as provide a tag that can be used multiple objects at different times.

SUMMARY OF THE INVENTION

An apparatus for temporarily attaching an RFID device to a mobile object, includes an RFID tag comprising an enclosure, attachment mechanism, handles, and an RFID device. The handles may be rotatable between a stowed position and a deployed position. The attachment mechanism may comprise magnets, which are used to attach the RFID tag to a metal support surface.

BRIEF DESCRIPTION OF THE DRAWINGS

FIG. 2 is a perspective view of a tag with open handles in the deployed position according to the invention;

FIG. 4 is a perspective view of a tag with closed handles in the stowed position according to the invention;

FIG. 7 is a top view of a tag according to the invention;

FIG. 8 is a side view of a tag with open handles according to the invention;

DETAILED DESCRIPTION OF THE INVENTION

Figure 1:
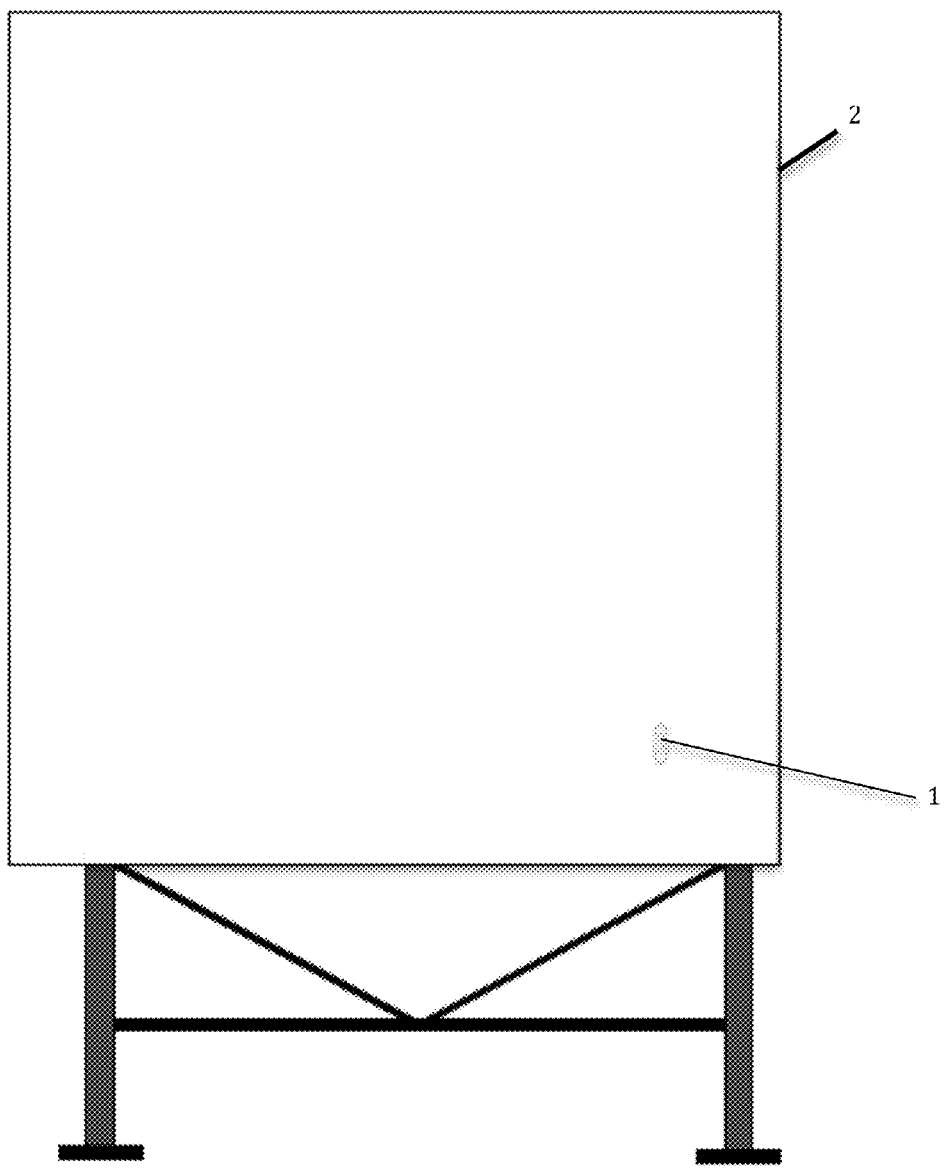
FIG. 1 is a view of a tag mounted on a trailer according to the invention.

FIG. 1 shows a tag 1 removably attached to a trailer 2. In an embodiment the tag is mounted in the lower right hand corner on the front end of a trailer 3-8 inches from the right and 6-18 inches up from the bottom of the trailer. Other objects to be tracked may include vehicles such as trucks, intermodal containers, and railcars, as well as containers, packages, baggage, and the like.

FIG. 2 is a perspective view of a removable tag 1. As shown in FIG. 2 the top of the tag is composed of the enclosure 3, and handles 4, 5. In an embodiment the enclosure is designed and constructed from materials that allow the tag to withstand vibration and mechanical shock, for example such as a drop from 6 feet onto a concrete surface, as well as be waterproof, and resistant to UV light and chemical hazards, for example such as sulfuric acid and salt water. Further, in an embodiment the enclosure is designed and constructed from materials that allow the tag to deliver excellent performance and reading stability across fluctuating temperatures in operating temperatures at least in the range of about −40 to +65° C. However, for tags that are used in milder climates less costly materials that do not meet theses temperature range requirements may be used to produce tags for less.

In the preferred embodiment the enclosure 3 is constructed of ABS plastic, however other materials may be used such as other plastics, metals, papers, and composites. Further, those skilled in the art will appreciate that other materials and combination thereof can be used to construct the enclosure.

The enclosure, as well as other components of the tag, may be constructed using a material that may be made to a custom color, or may have a coating, such as a paint, applied to it to give it a custom color. The purpose of such custom color may be for military purposes, or for quick visual reference to determine information such as ownership, contents, or point of origin. Further in an embodiment the enclosure may glow in the dark.

In an embodiment the enclosure is designed to meet or exceed many standards including an environment sealing rating of IP68 and shock and vibration endurance per MIL STD 810-F and BS EN 60068-2.

Figure 3:
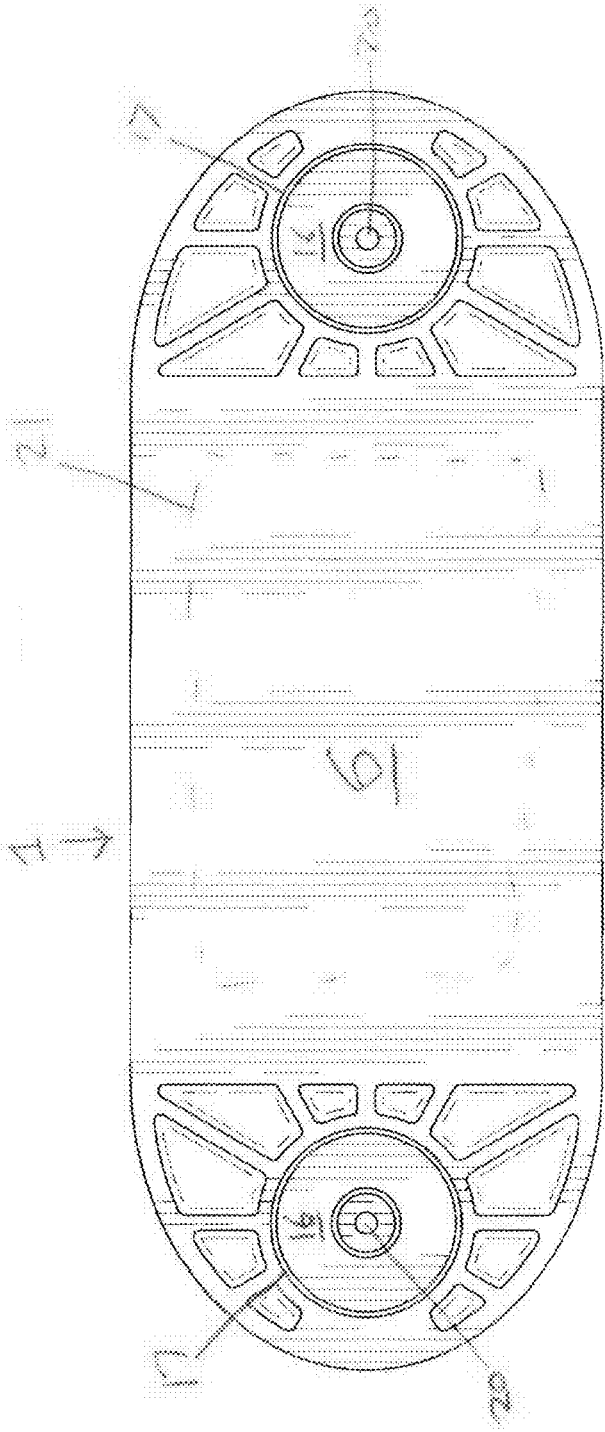
FIG. 3 is a bottom view of a tag according to the invention.
Figure 9:
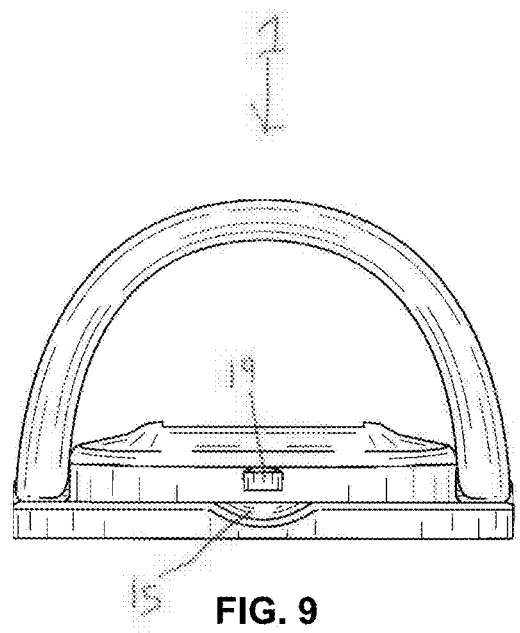
FIG. 9 is an end view of a tag with an open handle according to the invention.

FIG. 3 shows the bottom side 6 of the enclosure 3. In an embodiment the bottom side is generally rectangular in shape with rounded ends, however those skilled in the art will appreciate that the bottom side may be of any shape designed to fit in specific spaces.

In an embodiment, the enclosure is flush with the surface to which the tag is attached. In the case of a flat surface, the bottom side of the housing is preferably flat, and in the case of a curved surface the bottom side is preferably curved to match the curve of the surface. The enclosure may be constructed to be rigid or it may be constructed to be slightly deformable to be flush when attached to support surfaces that are imperfect or that deflect or change shape during use. This prevents the tag from being inadvertently removed if it is not perfectly flush with such surfaces. Further, the bottom side of the enclosure may have a rubberlike coating or layer that increases friction and flushness between the tag and the surface to which it is mounted. Further, those skilled in the art will appreciate that the bottom side can be formed to match the shape and surface features of any surface the tag it to be attached.

In addition to the bottom side of the enclosure being flush with the surface to which it is attached, it is also desirable for the tag to be generally flush with the object to which it is attached and, in general, to have a low profile. To achieve this in the preferred embodiment, the enclosure 3 has a maximum thickness of 1 inch (2.5 cm), this thickness is defined as the distance between the bottom side 6 and the top surface 7. This thin design prevents the tag from being inadvertently dismounted due to contact with passing objects, as well as being more aerodynamic. Further, in an embodiment the enclosure does not have sharp edges and hook-like features that would be prone to snagging and pulling the tag away from the surface to which the tag is attached. In an embodiment, the bottom edges of the enclosure include curved ends 8, 9 and straight sides 10, 11.

Figure 5:
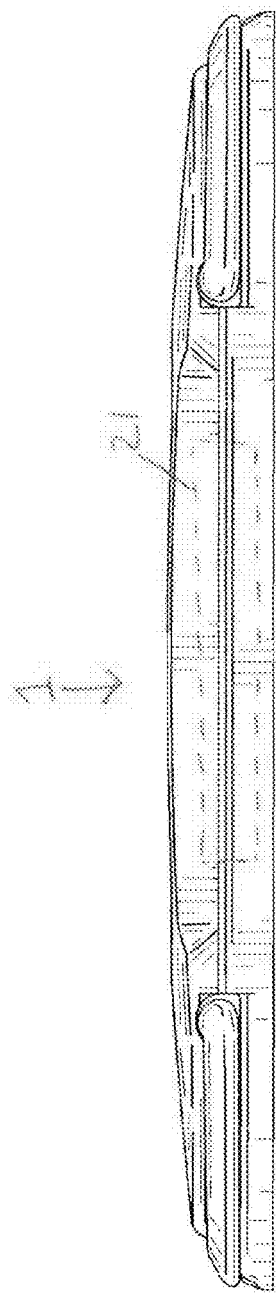
FIG. 5 is a side view of a tag with closed handles according to the invention.
Figure 6:
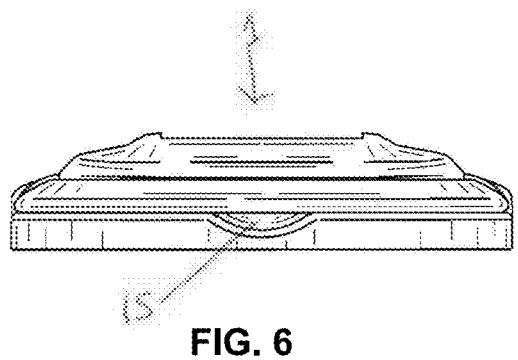
FIG. 6 is an end view of a tag with a closed handle according to the invention.

Further, the tag is intended for use outdoors and the tag includes design features that are optimized to slough off accumulation of water and snow. To do this, the top side of the enclosure 3 does not have cavities where water and ice could accumulate. As shown in FIG. 4, FIG. 5, and FIG. 6, the top side includes a beveled and curved surface and edges that allow water to run over the tag. Further, the tag may be treated with coatings designed to repel snow or water.

In an embodiment, the enclosure 3 has a top surface 7 to which an adhesive label may be affixed. In an embodiment, the size of the face and label allow for seven characters to be visible from a distance of five feet away. Further, the housing may contain a space on the side or top surface on which a barcode label may be placed which, in an embodiment a 13 digit barcode. The label and the barcode label are preferably weather resistant.

Handles are provided to make it easy for a person to place and remove the tag without the use of any special tools. FIG. 2 shows an embodiment with two handles 4, 5 that are affixed to the enclosure 3 in a way that allows them to be operable to selectively rotate from a deployed position as seen in FIG. 2 to a stowed position as seen in FIG. 4.

In an embodiment, the two handles 4, 5 are on each end of the enclosure. Each handle is composed of a u-shaped member. In an embodiment the u-shaped member has an opening with a diameter that is sufficient to allow access of a gloved finger, which in practice has been found to be about one inch. Those skilled in the art will appreciate that the u-shape member and opening may be of other sizes and shapes.

The u-shaped member comprises two axels 12 that engage within pivot points 13 located on the enclosure 3 to allow the u-shaped member to pivot relative to the enclosure between a stowed position (FIG. 4) and deployed position (FIG. 2). Alternatively, the u-shaped member may comprise two pivot points and the enclosure may contain one or more axels to engage within the pivot points of the u-shaped member. The pivot points and axels may contain detents that allow the handle to remain in a fully deployed position until a threshold holding force toward the stowed position is exceeded wherein the handle may be returned to the stowed position.

In the stowed position, the assembly of a handle and the enclosure has a lower profile than the deployed position. As shown in FIG. 4 in an embodiment the handles are flush with the enclosure while in the stowed position. To accomplish this the enclosure 3 has channels 14 which cradle the handles 4, 5, when the tag is in the stowed position. In an embodiment, the channel 14 has a u-shape complementary to the handle's u-shape and extends from a pivot point associated with a handle around the end of the enclosure and to the other pivot point associated with the handle.

The stowed position advantageously protects the handles from damage. Further, the handles being flush with the enclosure are not susceptible to being snagged open and causing the tag to be inadvertently dismounted. Further, the stowed position is more aerodynamic than the deployed position. Further, the flush design of the enclosure and handles in the stowed position also prevent accumulation of water, snow, and dirt.

To ensure that the handles do not inadvertently become deployed from the stowed position detents on the handle, enclosure, or both hold the handle in the stowed position, until a threshold holding force is exceeded. In an embodiment, each channel contains a channel detent 19 which engages with the inner surface of the u-shape member of the handle to hold the handle in the stowed position until a threshold holding force is exceeded, at which point the channel detent disengages with the inner surface of the u-shaped member.

To enable a user to manipulate the handle in a stowed position to exert the threshold holding force on the handle, the enclosure 3 has depressions 15 located on each end of the channels so that the under side of the handle is exposed when in the stowed position and a user can place the tip of a finger under the handle to exert force on the handle toward the deployed position.

As shown in FIG. 2, once in the deployed position the handles are in a position to allow the tag to be manipulated easily by a user to mount and dismount the tag to and from a support surface.

In an embodiment, the handles are made of a high strength PC/ABS blend or other engineered thermoplastic. The handles may be constructed using the same material or a different material than that of the enclosure. Further, each handle may be formed integrally with the enclosure, or each handle may be composed of multiple components.

FIG. 3 shows the bottom side of the tag. The tag is to be attached to an object, such as a trailer, truck, railcar, intermodal container, forklift, pallet, or crate by way of an attachment mechanism, which may include magnets, electromagnets, adhesives, suction, or mechanical fasteners such as Velcro®, a slot and groove combination, or a clip and flange combination, or any combination thereof.

Trucks, semi-trailers, intermodal containers, railcars, and other equipment commonly used in the shipping, transportation, and warehouse industries contain metal surfaces to which a magnet can be attached using magnetic forces. Therefore, in an embodiment the attachment mechanism is preferably one or more magnets. As shown in FIG. 3, an embodiment includes two magnets 16 located toward the ends of the bottom 6 of the tag. The magnets may be encapsulated within the enclosure, or they may be attached to the enclosure inside of a recess. In an embodiment, each magnet has a rating of 18.5 lbs, is mounted to the underside of the tag within a recess 17, and is held in place with countersunk screws 20. In this embodiment, 20 lbs of force is needed to remove the tag using the handles. With this configuration of magnets, the tag can be mounted and dismounted over 2,000 times.

In a preferred embodiment, the holding ability of the magnets exceeds any challenges posed by snow, rain, and vibration. In a preferred embodiment, the tag has the holding ability to be placed with a two-inch clearance from a trailer bottom and remains in place for at least three days of use. Further, the tag can do this over the entire lifetime of the tag.

Further, in a preferred embodiment the tag is mountable on a wet surface, or a surface covered with one mm of either ice, mud, or both. However, if stronger magnets are used the tag can be mounted on surfaces with more than one mm of either ice, mud, or both but would require more force for a user to remove.

A preferred embodiment is designed so that a 5' 0" person, who weighs 90 pounds wearing gloves could remove the tag from a mounted surface within three seconds. Further, the installation of the tag on a wet, iced, or muddy surface averages about 15 seconds.

Within the enclosure 3 is a RFID device 21. In an embodiment the RFID device is located within a void in the enclosure. In an embodiment, the RFID device is of the long range UHF passive type. In an embodiment, the RFID device is produced only within the FCC-approved band of 902-928 MHz. The RFID device has a read distance of at least 40-50 feet on-metal with existing reader and antenna setups. Further, off-metal tethered performance is the same as that of current permanent tags. In a preferred embodiment, the RFID device is an Alien Higgs 3 having 512 bits of user memory, and the EPC code is permanently locked in an effort to keep costs down.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. An RFID tag, comprising:
an enclosure defining and confining a void for receiving an RFID device;
said enclosure comprising an attachment mechanism with which said RFID tag is detachably secured to a support; and
at least one handle affixed to said enclosure and operable to selectively expose an opening with which said handle may be grasped for removal of said enclosure from said support;
wherein there are two handles affixed to the enclosure; and
wherein the handles are operable to selectively expose an opening with which said handle may be grasped for removal of said enclosure from said support by a rotating motion of the handles.

2. The RFID tag according to claim 1, wherein the handles comprise u-shaped members.

3. The RFID tag according to claim 1, wherein the enclosure comprises a channel, and
wherein a handle is operable to selectively be located within said channel and not expose the opening.

4. The RFID tag according to claim 3, wherein the handle is flush with the enclosure when the handle is located within the channel.

5. The RFID tag according to claim 1, wherein the enclosure comprises a detent
and wherein a handle is operable to selectively engage with said detent and be in a stowed position so that a threshold holding force must be exceeded for the handle to disengage with said detent and be able to rotate from said stowed position to a deployed position.

6. The RFID tag according to claim 5, wherein the attachment mechanism comprises at least one magnet.

7. The apparatus according to claim 1, wherein the attachment mechanism comprises at least one magnet located on a bottom surface of the enclosure.

8. The apparatus according to claim 7, wherein the enclosure comprises two recesses on the bottom surface, and
wherein two magnets are located within the recesses and are affixed to the enclosure with countersunk screws.

9. The apparatus according to claim 7, wherein there are two handles affixed to the enclosure.

* * * * *